(12) United States Patent
Cousins

(10) Patent No.: US 10,474,315 B2
(45) Date of Patent: Nov. 12, 2019

(54) CURSOR ENHANCEMENT EFFECTS

(71) Applicant: The Boeing Company, Chicago, IL (US)

(72) Inventor: Clifford G. Cousins, Cypress, CA (US)

(73) Assignee: The Boeing Company, Chicago, IL (US)

( * ) Notice: Subject to any disclaimer, the term of this patent is extended or adjusted under 35 U.S.C. 154(b) by 398 days.

(21) Appl. No.: 14/752,233

(22) Filed: Jun. 26, 2015

(65) Prior Publication Data
US 2016/0378295 A1 Dec. 29, 2016

(51) Int. Cl.
*G06F 3/0481* (2013.01)
*G06F 3/01* (2006.01)
*G06F 3/14* (2006.01)

(52) U.S. Cl.
CPC .......... *G06F 3/04812* (2013.01); *G06F 3/016* (2013.01); *G06F 3/1423* (2013.01); *G06F 2203/014* (2013.01); *G06F 2203/04801* (2013.01)

(58) Field of Classification Search
CPC ............................ G06F 3/016; G06F 3/04812
USPC .......................................... 345/157; 715/861
See application file for complete search history.

(56) References Cited

U.S. PATENT DOCUMENTS

| | | | | |
|---|---|---|---|---|
| 5,686,938 A * | 11/1997 | Batkhan | ................. | G09G 5/08 345/157 |
| 6,664,989 B1 * | 12/2003 | Snyder | ................. | G06F 3/038 715/856 |
| 7,586,481 B1 * | 9/2009 | Paquette | ............. | G06F 3/04812 345/157 |
| 7,730,430 B2 | 6/2010 | Baudisch et al. | | |
| 8,037,414 B2 * | 10/2011 | Michaelis | ............... | G06F 3/167 715/729 |
| 2004/0040805 A1 * | 3/2004 | Bailey | ................... | G01B 5/008 188/267.2 |
| 2004/0113888 A1 * | 6/2004 | De Waal | ................ | G06F 3/038 345/157 |
| 2008/0072154 A1 * | 3/2008 | Michaelis | ........... | G06F 3/04812 715/727 |
| 2009/0284532 A1 * | 11/2009 | Kerr | ...................... | G06F 3/0481 345/442 |
| 2010/0306702 A1 * | 12/2010 | Warner | ............... | G06F 3/04817 715/811 |

(Continued)

OTHER PUBLICATIONS

+Warwagon blogger, "How to lock your mouse inside a game on a dual monitor setup," Apr. 11, 2013, https://www.neowin.net.*

*Primary Examiner* — Amy M Levy
(74) *Attorney, Agent, or Firm* — Toler Law Group, PC

(57) ABSTRACT

According to an embodiment, a method includes detecting, at a computing device, a sustained repetitive actuation of an input device operatively connected to the computing device, the sustained repetitive actuation being above a first predetermined threshold period of time and magnitude, the input device being associated with a cursor on a display screen of one or more output devices in a first condition and operatively connected to the computing device, and activating one or more cursor enhancement effects associated with the one or more output devices into a second condition, wherein at least one property of the one or more cursor enhancement effects is based on at least one attribute of the detected sustained repetitive actuation.

27 Claims, 7 Drawing Sheets

(56) References Cited

U.S. PATENT DOCUMENTS

| | | | | |
|---|---|---|---|---|
| 2012/0146900 A1* | 6/2012 | Ishimoto | G06F 3/04812 | 345/157 |
| 2012/0159520 A1* | 6/2012 | Ueltschey, III | G06F 9/45508 | 719/323 |
| 2012/0327104 A1* | 12/2012 | Schrauben | G06F 3/04812 | 345/619 |
| 2013/0113703 A1* | 5/2013 | Zheng | G06F 3/038 | 345/157 |
| 2013/0179843 A1* | 7/2013 | Fletcher | G06F 3/04812 | 715/856 |
| 2015/0143266 A1* | 5/2015 | Strode | G06F 3/0489 | 715/761 |
| 2015/0268725 A1* | 9/2015 | Levesque | G06F 3/016 | 345/156 |
| 2015/0325026 A1* | 11/2015 | Haase | G06T 13/00 | 345/473 |
| 2016/0127508 A1* | 5/2016 | Perrin | G06T 1/20 | 709/219 |
| 2016/0313813 A1* | 10/2016 | Neisler | G06F 3/03543 | |

* cited by examiner

CURSOR ENHANCEMENT EFFECTS

FIELD OF THE DISCLOSURE

The present disclosure is generally related to computer displays and in particular to cursor enhancement effects for a user display in combination with a user input device such as a computer mouse.

BACKGROUND

A computing device may include or be coupled to a user input device (such as a computer mouse or pointing device) that enables a user to interact with the computing device, such as by controlling a cursor on a computer display. Occasionally, the user may be unable to locate the cursor on a particular display with one or more windows open, or on one display among multiple displays.

U.S. Pat. No. 7,730,430 "High Density Cursor System and Method" by Baudisch et al. teaches an enhanced appearance for a mouse cursor when the cursor moves in a linear direction at a speed that exceeds a predetermined threshold speed. When compared with an initial mouse cursor, the enhanced mouse cursor reflects an immediate increase in size based on the velocity of the movement and further includes a motion-blur effect along an interpolated cursor path to highlight the movement thereby allowing a user to track the movement of the cursor across the screen.

In some situations, a user may be visually distracted by graphical or textual features on the computer display, the sheer size and expanse of multiple displays may provide a large region, or the user may be visually impaired making cursor location difficult. Further, the user may be operating in a particular lighting environment that makes cursor location difficult, or the user may have a visual impairment or disability. Since it is usually easier to see a moving object than a non-moving object of the same size, type, and color, the user may attempt to locate the cursor by moving the pointing device to generate movement of the cursor across the display. Some applications also impose their own cursor constraints, where the cursor may change based on an editing mode, for example, where the editing mode cursor is smaller than the regular cursor. Because of these difficulties and others, these efforts may not always be sufficient to enable the user to quickly locate the cursor on a computer display.

SUMMARY

In a particular embodiment, a method includes detecting, at a computing device, a sustained repetitive actuation of an input device operatively connected to the computing device, the sustained repetitive actuation being above a first predetermined threshold period of time and magnitude, the input device being associated with a cursor on a display screen of one or more output devices in a first condition and operatively connected to the computing device, and activating one or more cursor enhancement effects associated with the one or more output devices into a second condition, wherein at least one property of the one or more cursor enhancement effects is based on at least one attribute of the detected sustained repetitive actuation.

According to another embodiment, a system includes a processor; and a memory accessible to the processor, the memory storing instructions that are executable by the processor to perform operations, including detecting, at a computing device, a sustained repetitive actuation of an input device operatively connected to the computing device, the sustained repetitive actuation being above a first predetermined threshold period of time and magnitude, the input device being associated with a cursor on a display screen of one or more output devices in a first condition and operatively connected to the computing device, and activating one or more cursor enhancement effects associated with the one or more output devices into a second condition, wherein at least one property of the one or more cursor enhancement effects is based on at least one attribute of the detected sustained repetitive actuation.

According to yet another embodiment, a computer-readable storage device storing instructions that are executable by a processor to cause the processor to perform operations, including detecting, at a computing device, a sustained repetitive actuation of an input device operatively connected to the computing device, the sustained repetitive actuation being above a first predetermined threshold period of time and magnitude, the input device being associated with a cursor on a display screen of one or more output devices in a first condition and operatively connected to the computing device; and activating one or more cursor enhancement effects associated with the one or more output devices into a second condition, wherein at least one property of the one or more cursor enhancement effects is based on at least one attribute of the detected sustained repetitive actuation.

DETAILED DESCRIPTION

Figure 1:
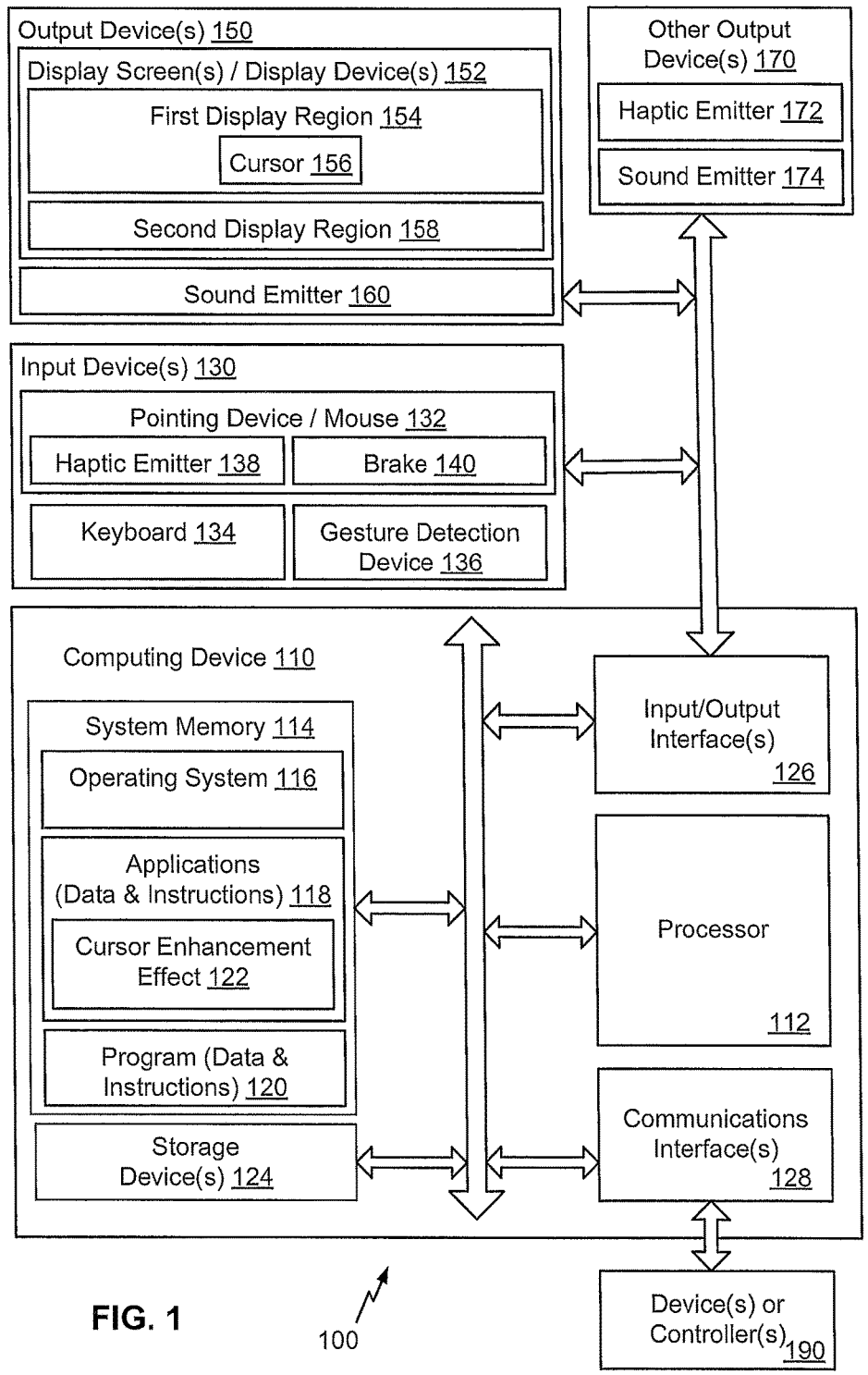
FIG. 1 is a block diagram illustration of an exemplary embodiment of a computing system to activate and then deactivate one or more cursor enhancement effects, in response to a sustained repetitive actuation of a computer input device.

Ordinarily, there is a one-to-one correspondence between motion of a user input device such as a computer mouse and the corresponding motion of an associated cursor, or a cursor icon, on a computer screen. The input device may be a pointing device that can operate based on motion of an object or can operate based on touching a pad or other related surface. A pointing device that is operated based on motion of an object may include a computer mouse, a track ball, a joystick, a pointing stick, a device with one or two inertial sensors for sliding on a mostly flat surface, and equivalents. A pointing stick may be a pressure sensitive "nub" used like a joystick between the 'G', 'H', and 'B' keys on a laptop keyboard, such as a TRACKPOINT® input device available from International Business Machines (IBM). A three-dimensional (3-D) pointing device such as a haptic interface, a floating joystick, or a floating sensor with three or more inertial sensors may also be used. The floating sensors may be mounted with or attached to a glove or other body-wearable attachment device so the motion of a human appendage may be used to move the corresponding cursor on a computer screen, for example. A pointing device that is operated based on touching a pad or other related surface may include a touchpad, a graphics tablet, a digitizing tablet, or other touch-sensitive surface in which the cursor location is not generated at the point initialized by touching the pad or other related surface, or a surface where an object is moved and such movement is detected and translated into a cursor movement on a computer screen such as a stereo optical sensor, or gesture detection device, that can detect movement of hands and fingers in a projection region corresponding to a projected keyboard or other input layout. As appropriate, any of the above mentioned pointing devices may include a force feedback system that generates a force that may be detected by a user of the devices. For example, a mouse input device may include a motor coupled to an eccentric that is activated to provide oscillation or vibration. Similarly, a haptic device may include a brake that may impede or resist motion at a virtual barrier. The brake may include a resistive element that resists movement of the input device in a certain dimension or at a certain boundary, for example.

The present disclosure describes cursor enhancement effects to help a user locate a cursor in a computer display and on one display among a plurality of displays. A cursor enhancement effect may be activated in response to a sustained repetitive actuation of a pointing device. As used herein, the phrase sustained repetitive actuation of the pointing device may include a "back and forth" movement of the pointing device either in a substantially straight line or along an arc based on the natural movement of a human hand about a pivot point like a human wrist or elbow, or the movement along a line (up-down, left-right, diagonal) based on manipulation of the pointing device using human fingers. Further, the phrase sustained repetitive actuation can include movement of the pointing device in a substantially circular or oval repeating pattern. For each of the repetitive actuations, one can determine various attributes such as the X-Y axis extremes of travel and a rough center point of the motion. For example, in a substantially linear, left-right repetitive actuation, one can determine the left-most point, the right-most point, and a rough center point of the left-right repetitive actuation. This would apply to substantially linear up-down repetitive actuations where one could determine the up-most point of travel, the down-most point of travel, and a rough center point of the up-down movements. For the substantially circular or oval repeating pattern, the up-most point of travel, the right-most point of travel, the down-most point of travel, the left-most point of travel, and the rough center of the circle or oval may be determined.

According to various embodiments, the cursor enhancement effect may temporarily change the appearance of the cursor on the display screen to make the cursor or the cursor location more obvious to or noticeable by the user in a shorter period of time. Alternatively, or in combination with the aforementioned cursor effects, according to various embodiments a display region around the cursor may be temporarily changed to assist a user in locating the cursor in a shorter period of time. In yet another alternative, and in a further combination with the aforementioned cursor effects, according to various embodiments a cursor enhancement effect may include the emission of various sounds to and/or the providing of tactile feedback to a user in response to the detecting sustained repetitive actuation of the pointing device. In this manner, the cursor enhancement effect may include one or more effects that do not modify a display characteristic of the cursor or the related display devices. These various embodiments are further described herein below.

FIG. 1 is a block diagram illustration of an exemplary embodiment of a computing system 100 including a computing device 110 that is operable to activate and then deactivate one or more cursor enhancement effects in response to a sustained, repetitive actuation of an input device 130. The computing device 110 may include at least one processor 112. Within the computing device 110, the at least one processor 112 may communicate with a system memory 114, one or more computer-readable storage devices 124, one or more input/output interfaces 126, one or more communications interfaces 128, or a combination thereof. The one or more storage devices 124 may comprise a computer-readable storage device storing instructions that are executable by a processor to cause the processor to perform operations according to various embodiments described herein. The input device 130 may include a computer mouse or other pointing device 132, a computer keyboard 134, or a gesture detection device 136 including two or more optical sensors for detecting gestures of a user. Such gestures could be repetitive in nature, and may resemble the back-and-forth or substantially circular or oval movements described by the pointing device, above. The pointing device or mouse 132 may include a haptic emitter 138 and a brake 140. The haptic emitter may be configured to provide a haptic response that is at least one of an impulse, a vibration, or a contact surface shock to a user through the associated pointing device 132. Each haptic response may include one or more haptic attributes such as magnitude, frequency, and a repeating pattern. The brake 140 may provide resistance to movement, as described above. The computer-readable storage devices 124 may have all of the attributes of system memory 114, and may be removable.

The system memory 114 may include volatile memory devices (e.g., random access memory (RAM) devices), nonvolatile memory devices (e.g., read-only memory (ROM) devices, programmable read-only memory, and flash memory), or both. The system memory 114 may include an operating system 116, which may include a basic input/output system for booting the computing device 110 as well as a full operating system to enable the computing device 110 to interact with users, other programs, and other devices. The system memory 114 may also include one or more applications 118 (e.g., data and instructions) and other programs (e.g. data and instructions) 120. The program data 120 may include data and instructions used by the applications 118 to perform respective functions of the applications. The applications 118 may include cursor enhancement effect (e.g. data and instructions) 122 that may be a standalone program, a component of another application, or a component of the operating system 116.

The one or more computer-readable storage devices 124 may include nonvolatile storage devices, such as magnetic disks, optical disks, or flash memory devices. The storage devices 124 may include removable memory devices, non-removable memory devices, or both. In a particular embodiment, the storage devices 124 may be configured to store the operating system 116, the applications 118, the program data 120, the cursor enhancement effect instruction 122, or a combination thereof. The system memory 114 and the storage devices 124 are physical devices and are not transitory signals.

The one or more input/output interfaces 126 may enable the computing device 110 to communicate with one or more other input/output devices (130, 150, 170) to facilitate user interaction. For example, the one or more input/output interfaces 126 may be adapted to receive input from a user, to receive input from another computing device, to provide output to a user, or a combination thereof. Various embodiments of input and output devices are contemplated. In a non-limiting example, an input device 130 is considered to equivalent to an input device that is one of other input/output devices 170. Similarly, one or more display screens or display devices 152, haptic emitter 172, and sound emitters (160, 174), such as speakers and/or headphones, may be considered generally as output devices (150, 170). The input/output interfaces 126 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input devices 130 may include user interface devices, including some combination of buttons, keyboards, pointing devices, touch screens, and other devices. Any of these may be co-mounted with any of the output devices (150, 170). For example, stereo speakers may be mounted on each of several display devices 152, or speakers may be mounted only on selected display devices based on their location within a cluster of display devices. While it is possible, it is not necessary that the several display devices 152 be identical to each other. The several display devices 152 may include several displays of differing sizes, screen resolutions, and capabilities. The input/output devices (130, 170) may include stereo headphones for emitting sound or a haptic emitter located either on the pointing device 132 or located away from the pointing device 132 but in contact with a user position, such as attached to a chair or other support device, to provide haptic (sense or tactile) feedback to a user.

The at least one processor 112 may detect interaction events based on user input received via the input/output interfaces 126. Additionally, the at least one processor 112 may send a display command or signal to one or more display devices 152 and receive position information from a pointing device 132 via the input/output interfaces 126. The one or more display devices 152 may render a display image on one or more display screens, where the one or more display devices 152 may include a first display region 154 surrounding a cursor 156 based on the display image and cursor representations superimposed upon the display screens sent via commands from the at least one processor 112. The display device 152 containing the cursor 156 in a first display region 154 may also include a second display region 158 not surrounding the cursor 156. Multiple regions of different size and shape may be included on a display screen or image display rendered on a particular display device 152. The first display region 154 and the second display region 158 may be controlled separately to provide a visual contrast and to help isolate and identify the first display region 154 containing the cursor 156. The pointing device 132 may be used to move the cursor 156 about, within, or between the one or more display screens on the one or more display devices 152. In this manner, multiple display screens may be combined to effectively provide a larger, composite display screen. In some instances, a regular array of display devices 152 may be arranged in a 1×2, 2×2, 1×3, 2×3, 3×2, and 4×4, etc. to provide a larger effective viewing surface. Locating a cursor on composite display with a larger effective viewing surface can be especially challenging. As used herein, the terms render or rendered refer to the process of presenting information on one or more display screens, and may include various programming elements as a display driver or other software. The information presented through an image display element in the one or more display devices 152 may include graphical, textual, photographic, animation, or various other forms of visual media on the associated display screens, and may be supplemented by audio information emitted from speakers, or sensory information emitted from a haptic emitter. The point device 132 may also include a haptic emitter 138 operatively connected to the pointing device and configured to interact with a user's sense of touch by providing an impulse, a vibration, or a contact surface shock through the pointing device. The impulse may be provided by a solenoid. The vibration may be provided by a motor coupled to an eccentric. The contact surface shock may be electrical or impulsive in nature, and could be provided by a fine grid of wires energized with a small electric shock to provide a sense to a user in contact with the pointing device, or may be provided by one or more piezoelectric elements configured to provide a physical impulse when energized. The point device 132 may also include a brake 140 configured to resist motion of the haptic device in some manner. For example, the brake 140 when activated may provide friction to a moving (rotating or sliding) surface, thereby impeding motion of a portion of the pointing device 132 in response to encountering a virtual boundary.

The one or more communications interfaces 128 may enable the computing device 110 to communicate with one or more other computing devices or controllers 190. The one or more communications interfaces 128 may include wired Ethernet interfaces, Institute of Electrical and Electronics Engineers (IEEE) 802 wireless interfaces, Bluetooth communication interfaces, electrical (or power line) interfaces, optical or radio frequency interfaces, or other wired or wireless interfaces. The other computer devices or controllers 190 may include host computers, servers, workstations, portable computers, telephones, tablet computers, or any other communication device or component.

In a particular embodiment, the at least one processor 112 is configured to implement computer executable instructions, such as the applications 118, stored at the system memory 114. The instructions may be executable to cause the at least one processor 112 to perform operations. For example, when the at least one processor 112 executes the cursor enhancement effect instructions 122, the operations may include detecting repetitive actuation of a pointing device 132. Detection may be nearly instantaneous if repetitive actuation is sustained during a relatively short first predetermined time period.

The cursor enhancement effect operations may further include, in response to the repetitive actuation being sustained on a user input device, activating one or more cursor enhancement effects associated with a cursor of the computing device. A property of the cursor enhancement effect may be based on an attribute of the repetitive actuation as described further with reference to FIGS. 2A-2L, 3A, and 3B. The properties or attributes may include the speed (e.g. velocity) and intensity (e.g. magnitude) of the repetitive actuation as well as a change in speed (e.g. acceleration or deceleration) of the repetitive actuation. One cursor enhancement effect may cause a display (e.g., the display device 152) rendered by the computing device to change in response to the detected repetitive actuation. Simultaneously, further cursor enhancement effects may include any combination of haptic and sound emissions, alone or in combination with the cursor changes.

Thus, FIG. 1 describes the cursor enhancement effect instructions 122 that may enable the computing device 110 to help a user locate a cursor on one or more computer display devices 152. Cursor enhancement effect instruction 122 may cause cursor enhancement effect to be activated in response to a sustained repetitive actuation of the pointing device 132. The cursor enhancement effect activated by the cursor enhancement effect instructions 122 may make the cursor 156 in a rendered display of the display devices 152 more obvious to the user. For example, the cursor enhancement effect may make the cursor more noticeable by changing properties of the cursor or other elements of the rendered display. Therefore, the cursor may become easier for the user to locate in the rendered display, enabling the user to find the cursor in the rendered display in a shorter period of time.

Figure 2A:
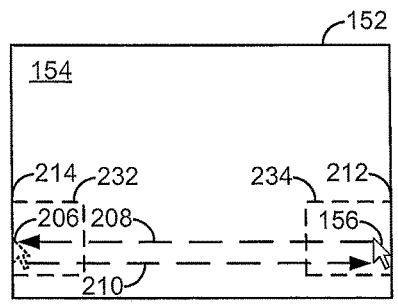
FIGS. 2A through 2L illustrate various exemplary embodiments of activating a cursor enhancement effect on one display screen, in response to detecting the sustained repetitive actuation of an input device.

Referring to FIG. 2A, an exemplary embodiment of activating a cursor enhancement effect on one display screen in response to a repetitive actuation is shown. In FIG. 2A, a display device 152 includes a first display region 154 containing a cursor 156. A user may manipulate or move the pointing device 132 (FIG. 1) in such a manner that cursor 156 also moves along a first path in a first direction 208 to a second cursor position 206. In normal operation, and prior to activation of the cursor enhancement techniques described herein, moving the pointing device 132 corresponds to moving the cursor 156, so these phrases may be used interchangeably. The user may then move the cursor 156 along a second path in a second direction 210 which is substantially opposite to the first direction 208 to return the cursor to a place that is near its initial position. The first path 208 and second path 210 may be substantially opposite each other, or they may be mirror images of each other, as described more fully in reference to FIG. 2J. When substantially opposite each other, the paths may substantially overlap each other as they travel in generally a straight line or else they may follow the same or a similar arc. When mirror images of each other, the first path 208 and second path 210 may form a substantially closed or continuous shape such as an oval or a circle where the first path 208 and second path 210 constitute semi-oval or semi-circular traces that substantially outline these shapes, such as the upper and lower arcs describing these shapes. If the user repeatedly (e.g., 3 or more times) moves the pointing device 132 so the cursor 156 moves in this manner (e.g., approximately along the first path 208 and second path 210) in a relatively short period of time (e.g., threshold of about 0.5 seconds), computing device 110 generating the rendered information on display device 152 may detect that a repetitive actuation has occurred. Other threshold values may be used to detect the onset of repetitive actuation oscillations and set based on user preference or need. For example, the repetition rate (e.g. cycles/second) and duration may be lower or higher so that as few as two repetitions in about 0.5 seconds or as many as ten repetitions in about 2.0 seconds could be used. The type and nature of the pointing device 132 will influence what qualifies as detectable, sustained repetitive actuation as compared with non-repetitive or ordinary usage of the pointing device to move a cursor on a computer screen because some pointing devices 132 are easier to manipulate than others. Also, a higher duration may be needed for proper detection if the repetitive actuation pattern of movement is not substantially repeated with large variations in the pattern. If the repetitive actuation continues (e.g., for a threshold period of time or threshold period of cycles), the computing device 110 may activate one or more cursor enhancement effects. In one example, the repetitive actuation may be detected when the cursor 156 repeatedly moves back and forth between a first region 232 and a second region 234 (in FIG. 2A) of the rendered display instead of requiring the cursor 156 to be moved back and forth between two more precise locations. The size of each region (232, 234) is selectable based on user preference or need.

In the example of FIG. 2A, the cursor enhancement effect may include one or more effects that do not modify a display characteristic of the cursor 156 or the related display screen region 154. For example, the computing device may generate a first sound when a position of the cursor 156 corresponds with a first edge 212 of the display device 152. The computing device may further generate the first sound or a second sound when a position of the cursor 156 corresponds with a second edge 214 of display device 152. As another example, the computing device may also (or in the alternative) generate tactile feedback at the pointing device associated with the cursor 156 when a position of the cursor 156 corresponds with either the first edge 212 or the second edge 214. The first sound, the second sound, and tactile feedback may be generated while the repetitive actuation is detected. An intensity, pitch, or other property of the sound may be determined based on how long the repetitive actuation has been sustained, a speed of the repetitive actuation prior to the position of the cursor 156 corresponding with an edge of the display device 152, a frequency of the repetitive actuation prior to the position of the cursor 156 corresponding with an edge of the display device 152, or any other attribute of the repetitive actuation. For example, the sound may gradually get louder as the repetitive actuation is sustained and the pitch may increase as the speed of the repetitive actuation prior to the position of the cursor 156 corresponding with an edge of the display device 152 increases. The computing device may cease generating the first sound, second sound, and/or the tactile feedback when a position of the cursor corresponds with the first edge 212 or the second edge 214 if the repetitive actuation has stopped. Other edges or artificial boundaries within the edges may be used, and may correspond to either upper-lower, left-right, or other complex boundary regions, for example (See FIG. 2K).

Figure 2B:
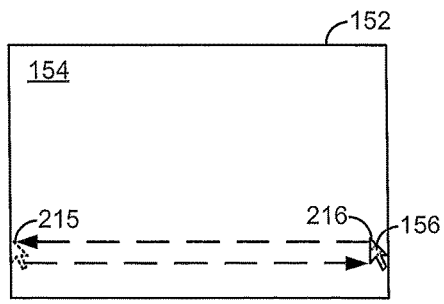

Referring to FIG. 2B, another embodiment of a cursor enhancement effect is shown. In FIG. 2B, the cursor enhancement effect may change a color of the cursor 156 from a first color at 215 to a second color at 216. The color change may also not be screen or cursor location dependent, but may instead reflect a palette of pre-defined changes after the repetitive actuation is detected. The cursor enhancement effect may change a color by changing a brightness (e.g. luminosity or illumination level) of or an intensity of a color that is already present in the cursor 156 or the cursor enhancement effect may change the color of the cursor 156 to be a different color. In one embodiment, the cursor enhancement effect may continuously change the color of the cursor 156 while the repetitive actuation is sustained. For example, the color may be changed gradually (e.g., over a range of hues between 215 and 216) or the color may be changed rapidly (e.g., may flash between the first color and the second color, with or without a bright white flash in between the color changes). The speed at which the cursor changes between the first color and the second color may be related to a length of time that the repetitive actuation is sustained, a speed of the repetitive actuation, a frequency of the repetitive actuation, or any another attribute or property of the repetitive actuation. For example, the cursor 156 may change between the first color and the second color at an increasingly frequent rate (e.g. may speed up) as the repetitive actuation is sustained for a longer period of time. In another example, the first color or second color may also be determined by any attribute of the repetitive actuation (e.g., moving in a first direction causes the cursor to be the first color and a second direction results in the second color). The rate of change and/or flashing may also increase or decay at a linear or exponential rate based on an attribute of the repetitive actuation. In another example, the cursor enhancement effect may change the color once (e.g., change from the first color to the second color at 216) and then keep the color of the cursor 156 as the changed color until the repetitive actuation stops.

Figure 2C:
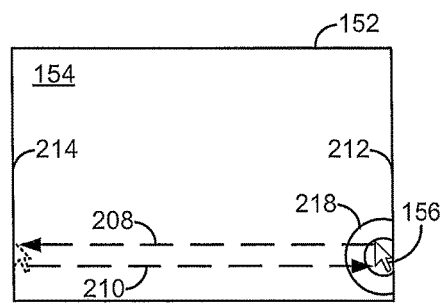

Referring to FIG. 2C, another embodiment of a cursor enhancement effect is shown. In FIG. 2C, the cursor enhancement effect causes an area around the cursor 156 to be changed to draw attention to make the cursor 156 or the cursor location more obvious to or noticeable by the user in a shorter period of time. For example, the cursor enhancement effect may include a visual ripple effect that causes animated ripples 218 to appear on the display device 152 originating from the position of the cursor 156 and radiating outward from the cursor location, like ripples in a still pond when a stone is thrown into the water. Alternatively, instead of radiating outward from the cursor location, the ripples 218 may move towards the cursor 156. The ripples 218 may form a series of concentric rings that allow an observer to visually identify the center of movement as the rings move away from (or toward) the cursor location, thereby identifying the display containing the cursor 156 based on the movement. The ripples 218 may be rendered on the single display containing the cursor 156. However, when using multiple display screens, the ripples may be rendered and synchronized across the multiple displays to create a virtual ripple spanning multiple display devices 152 based on the physical separation between the multiple screens relative to each other, to form a series of larger concentric rings. The ripples 218 may be generated constantly during the repetitive actuation of the cursor 156 or may be generated when the cursor 156 reverses directions (e.g., moving from the first path 208 to the second path 210 or vice versa). The ripples 218 may be removed from the rendered display when the repetitive actuation is stopped or the ripples 218 may continue moving on the rendered display until the ripples 218 propagate off the rendered display (e.g., pass the first edge 212 or the second edge 214). The speed at which the ripples 218 propagate, the size of the ripples 218, or any other property of the ripples 218 may be based on a speed of the repetitive actuation, a magnitude of the repetitive actuation, a frequency of the repetitive actuation, length of time that the repetitive actuation has been sustained, or any other attribute or property of the repetitive actuation. For example, the ripples 218 may propagate across the display device 152 at the same of the repetitive actuation at the time a particular ripple was generated. In another example, the ripples 218 may be thicker when the frequency of the repetitive actuation is higher.

Figure 2D:
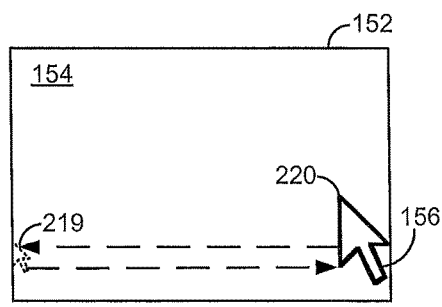

Referring to FIG. 2D, another embodiment of a cursor enhancement effect is shown. In FIG. 2D, the cursor enhancement effect may cause the cursor 156 to increase in size (e.g., from a first size at 219 smoothly to a second size at 220). For example, the cursor enhancement effect may cause the cursor 156 to quickly but continuously increase to a predetermined size when the sustained repetitive actuation is detected. In this way, the change in size is fluid rather than a simple jump to a larger size. As another example, the cursor enhancement effect may cause the cursor 156 to gradually increase in size while the repetitive actuation is sustained. In this example, the cursor 156 may continue increasing until the cursor 156 reaches a predetermined maximum size (e.g., ⅛ of the display device 152). The speed at which the cursor 156 increases in size or the size that the cursor 156 is increased to may be based on a speed of the repetitive actuation, a magnitude of the repetitive actuation, a frequency of the repetitive actuation, length of time that the repetitive actuation has been sustained, or any other attribute or property of the repetitive actuation. For example, the cursor 156 may increase in size at a faster rate when magnitude (e.g., the length of the repetitive actuation before repeating) is larger. The predetermined maximum cursor size may be a fraction of the display size corresponding to a size between about one-thirty-second to about one-fourth of the display screen size, a font point size corresponding to between about 18-points to about 288-points, or a linear size corresponding to between about 0.5 inches to about 4.0 inches. As will be further described in reference to FIG. 5, when the repetitive actuation is ceased or stopped, the cursor 156 may quickly and continuously return to the cursor's original size (e.g., the size at 219). Alternatively, the cursor 156 may gradually reduce in size until the cursor 156 is displayed as the original size.

Figure 2E:
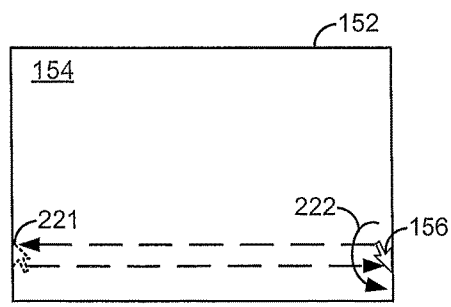

Referring to FIG. 2E, another embodiment of a cursor enhancement effect is shown. In FIG. 2E, the cursor enhancement effect may rotate the cursor 156 (e.g. from a first orientation at 221 to a second orientation at 222). For example, the cursor 156 may be rotated to a particular angle or the cursor 156 may continually be rotated while the repetitive actuation is sustained. As another example, the rotation of the cursor 156 may increase in speed while the repetitive actuation is sustained so that the cursor 156 rotates in a circle. The speed of the rotation or the angle that the cursor 156 is rotated to may depend on a speed of the repetitive actuation, a magnitude of the repetitive actuation, a frequency of the repetitive actuation, length of time that the repetitive actuation has been sustained, or any other attribute of the repetitive actuation. For example, the speed of the rotation may increase the longer that the repetitive actuation is sustained. When the repetitive actuation is stopped, the cursor 156 may return to an original orientation (e.g., the first orientation at 221) or rotation of the cursor 156 may gradually slow down until stopping at the original orientation.

Figure 2F:
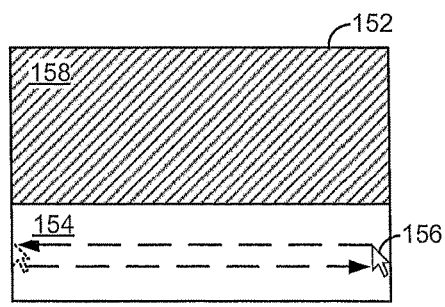

Referring to FIG. 2F, another embodiment of a cursor enhancement effect is shown. In FIG. 2F, the cursor enhancement effect may change properties of a second region 158 of the display device 152 without the cursor 156 to draw attention to the region of the rendered display with the cursor 156. For example, the cursor enhancement effect may decrease a brightness of or an intensity of a color in a second display region 158 of the display device 152 in which the cursor 156 is not located. The brightness or intensity of the color of the second display region 158 may decrease, or "dim", to a predetermined level when the repetitive actuation is determined to be sustained or the brightness/intensity may gradually decrease while the repetitive actuation is sustained. As a limit, the intensity or brightness may decrease until the second display region 158 is completely un-illuminated, or dark, in response to the duration of the sustained repetitive actuation. In another example, the second display region 158 may change to a different color rather than change the intensity of the existing colors. The speed at which the second display region 158 changes, the color that region 158 changes to, or an intensity level that the region 158 changes to may be based on a speed of the repetitive actuation, a magnitude of the repetitive actuation, a frequency of the repetitive actuation, length of time that the repetitive actuation has been sustained, or any other attribute or property of the repetitive actuation. For example, the color that the region 158 changes to may be determined by a hot/cold color scheme, where the color is "hotter" the faster the repetitive actuation is. While the region of lighter and darker intensity is shown as rectangular, any region shape may be used so long as the cursor remains in a higher intensity color or illumination region throughout the travel of the cursor 156. One may determine the boundaries of travel and construct a rectangular or oval region to contain the corresponding movement of the cursor. The color or illumination intensity may return to a normal level upon the repetitive actuation being stopped or the intensity may gradually return upon the repetitive actuation being stopped.

Figure 2G:
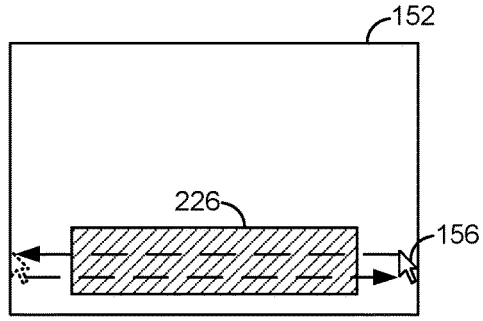

Referring to FIG. 2G, another embodiment of a cursor enhancement effect is shown. In FIG. 2G, the cursor enhancement effect may change properties of a portion 226 of the display device 152 along the path of the cursor 156 to bring attention to the cursor. For example, the cursor enhancement effect may cause the display device 152 to persistently change a portion 226 of the display device 152, like painting with a paintbrush, to render a particular color along a path of the cursor 156. The color may be a predetermined color or the color may change based on the original color of the display device 152 before the cursor goes over the portion 226. The color change may persist as long as the repetitive actuation is sustained or the color may gradually fade if the repetitive actuation does not go over the portion 226 for a period of time. A length of time the color remains, the color that is left behind, or the intensity of the color may be determined by a speed of the repetitive actuation, a magnitude of the repetitive actuation, a frequency of the repetitive actuation, length of time that the repetitive actuation has been sustained, which particular paths are traced within the region, or any other attribute or property of the repetitive actuation. For example, the color may return to normal faster if the repetitive actuation is faster. The colors of the display device 152 may quickly return to normal when the repetitive actuation is stopped or the rendered color may gradually fade when the repetitive actuation is stopped.

Figure 2H:
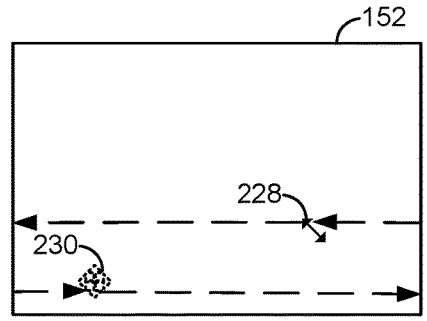

Referring to FIG. 2H, another embodiment of a cursor enhancement effect is shown. In FIG. 2H, the cursor enhancement effect may change the cursor 156 to a first shape 228. For example, the first shape 228 may be an animated image or a still image (e.g. icon, or image file). In this manner, the cursor 156 may be transformed into an animated image or a still image. A speed of movement of the animation image may increase as the length of time of the repetitive actuation increases. In another example, the cursor enhancement effect may change or transform the cursor to the first shape 228 when the cursor is moving in a first direction during the repetitive actuation. The cursor enhancement effect may change the cursor into a second shape 230 when the cursor is moving in a second direction during the repetitive actuation. In this manner, the first and second shapes may illustrate a perception of a moving image to the eyes of a user. The second shape 230 may also be an animated image or a still image. If the still or animated image is that of an animal or human character, the eyes of the animal or human character may track with the back and forth or substantially circular movement of the pointing device 132. For example, when the cursor enhancement effect changes the size of the displayed cursor 156, one can consider that the sustained repetitive actuation of the input 130 "pumps up" the cursor to a maximum size defined by the saturation size limit, and the pumped up cursor may be animated as an arrow balloon that looks about to burst. In another example, the cursor enhancement effect may alternate the shape of the cursor between the first shape 228 to a second shape 230 at an increasing rate while the repetitive actuation is sustained without regard to the direction the cursor is moving in. The cursor size may remain approximately the same in both the first shape 228 and the second shape 230. In another embodiment, more than two shapes may be used. The shape used, the speed at which the shape changes, a speed that the animation plays at, or another property of the shape may be based on a speed of the repetitive actuation, a magnitude of the repetitive actuation, a frequency of the repetitive actuation, length of time that the repetitive actuation has been sustained, or any other attribute of the repetitive actuation. With this and other cursor enhancement effects, the actual location of the rendered cursor 156 or cursor icon may move with the movement of the input device, the cursor 156 may be frozen at the screen location when the sustained repetitive actuation was first detected, or the cursor 156 may jump to a predetermined, neutral location such as the center of the identified display device 152.

Figure 2I:
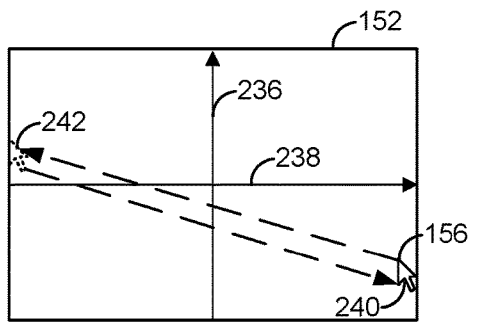

Referring to FIG. 2I, another embodiment of a cursor enhancement effect is shown. In FIG. 2I, the display device 152 may include a first axis 236 and a second axis 238. One cursor enhancement effect may cause the computing device to generate a sound based on a position of the cursor 156 on the display device 152 along the first axis 236 and the second axis 238. For example, a pattern, tone, frequency, volume, apparent location of the sound (e.g., a speaker or combination of speakers used to emit sound), or a combination thereof, may be based on a position of the cursor 156 along the one or more of the axes (236, 238). To illustrate, the tone of the sound may be based on a position of the cursor 156 along the first axis 236, and the volume of the sound may be based on a position of the cursor 156 along the second axis 238. In another example, the pattern, tone, frequency, volume, apparent location of the sound (e.g., a speaker or combination of speakers used to emit sound), or a combination thereof, may be based on a speed of the repetitive actuation, a magnitude of the repetitive actuation, a frequency of the repetitive actuation, length of time that the repetitive actuation has been sustained, or any other attribute or property of the repetitive actuation, in addition to or instead of the position of the cursor 156 along the axes 236, 238. In another example, tactile feedback may be provided to the user corresponding to the location of the cursor on either of the axes 236, 238. The nature of the tactile feedback may indicate the relative position of the cursor in reference to either of the axes. For example, when the tactile feedback is due to a motor-driven eccentric causing vibration or oscillation, the position of the cursor 156 relative to the axis 236 may correspond to a spectrum of frequencies having continuous oscillation, while the position of the cursor 156 relative to the axis 238 may correspond to a spectrum of frequencies having pulsed oscillation, or vice versa. In this manner, a visually impaired user may be able to locate the cursor on the screen and move it to a desired location. It is not necessary that the back-and-forth repetitive actuation of the input device move the cursor 156 in a straight, left-and-right manner. As described above, the back-and-forth actuation may exhibit an angle or inclination as would be expected from a left (or right) handed operator.

Figure 2J:
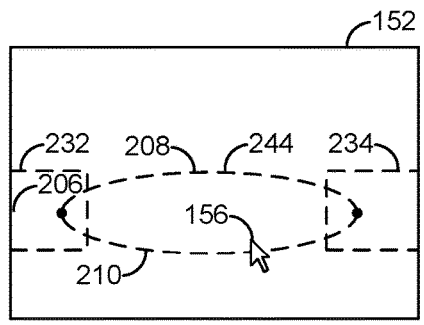

Referring to FIG. 2J, an exemplary embodiment of activating a cursor enhancement effect on one display screen in response to a repetitive actuation is shown. In FIG. 2J, a display device 152 includes a cursor 156. A user may manipulate or move the pointing device 132 (FIG. 1) in such a manner that cursor 156 also moves along a first path in a first direction 208 to a second cursor position 206. The user may then move the cursor 156 along a second path in a second direction 210 which is substantially opposite to the first direction 208 to return the cursor to a place that is near its initial position. When the first path 208 and second path 210 are mirror images of each other, the first path 208 and second path 210 may form a substantially closed or continuous shape such as a circle or an oval 244 where the first path 208 and second path 210 constitute semi-oval or semi-circular traces that substantially outline these shapes, such as the upper and lower arcs describing these shapes.

Figure 2K:
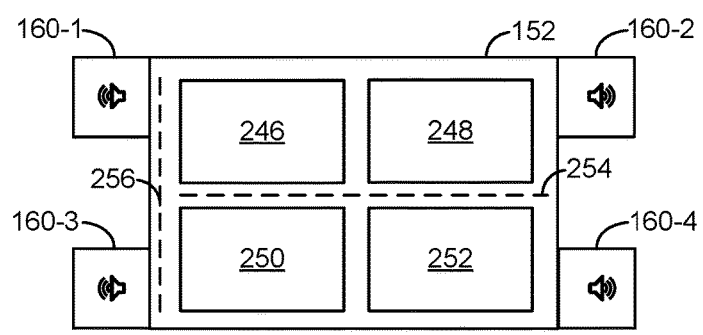

Referring to FIG. 2K, an exemplary embodiment of activating a cursor enhancement effect on one display screen in response to a sustained repetitive actuation is shown. A visually impaired user may be working within various, non-overlapping regions (246, 248, 250, and 252) on a particular screen, and may have difficulty visually locating the cursor 156 in relation to one of the several fields. Such fields could contain text that is read by a machine text-to-voice translator, for example. Such fields could also include a zoom feature allowing a visually impaired user to magnify text or images in a selected field or sub-region of a particular screen. Sound emissions and/or haptic feedback such as vibration may be provided to the user via haptic emitters (138, 172) when the cursor 156 traverses one of the several intermediate boundaries 254 between the non-overlapping regions, or extreme boundaries 256 on the outside of the non-overlapping regions on a display device 152, or merely to identify when the cursor is within a particular non-overlapping region (246-252). A user may receive vibration at a first frequency and/or intensity when the cursor 156 is located within region 246, and the user may receive vibration at a second frequency and/or intensity when the cursor 156 is located within region 248, for example. An intermediate boundary is one between any two of the non-overlapping regions (246-252) while extreme boundaries are along the four edges of display screen 152 on the periphery of the non-overlapping regions (246-252). As mentioned above, the haptic emitters (138, 172) may provide a haptic effect that is at least one of an impulse, a vibration, and a contact surface shock. Each of the haptic effects may have one or more haptic attributes including magnitude, frequency, and a repeating pattern. For example, As described in reference to FIG. 2A, two or more stereo audio speakers (160-1, 160-2, 160-3, 160-4) or stereo headphones may be used to provide a spatial-auditory indication of the cursor location. A first pair of speakers (160-1, 160-2) and a second pair of speakers (160-3, 160-4) may be used independently or cooperatively. The pairs may be oriented as a third pair (160-1, 160-4) and fourth pair (160-2, 160-3) to provide both vertical and horizontal stereo displacement, or all four speakers (160-1, 160-2, 160-3, and 160-4) may be used to provide precise auditory feedback regarding the cursor 156 location in reference to the regions (246-252), intermediate boundaries 254, and extreme boundaries 256. Such speakers may also be engaged with the computing device as an output device 170 as a sound emitter 174, and such stereo speakers may be included in any of the displays (152, 152-1, 152-2) described herein. Further, such speakers may be included within or attached near each corner of each display 152 to provide auditory information to a user positioned in front of or near the display. For a multiple display embodiment, each display could have a single speaker that could be used cooperatively to provide a stereo effect, for example. A currently playing audio program, such as music, would be suspended or attenuated during the duration of an auditory cursor enhancement effect. The cursor enhancement techniques described herein could also be used to locate the cursor in one of several regions or fields on a particular computer screen, or on multiple display screens, as described further in reference to FIGS. 3A-3B.

Figure 2L:
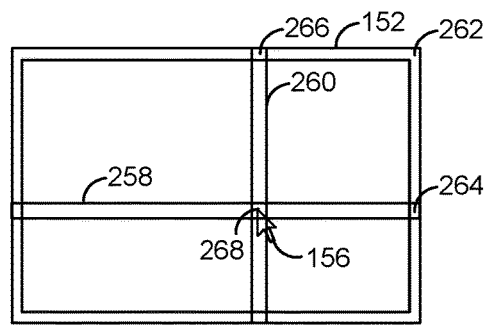

Referring to FIG. 2L, an exemplary embodiment of activating a cursor enhancement effect on one display screen in response to a sustained repetitive actuation is shown. When activated, the cursor enhancement effect may add a horizontal boundary indicator (258) and a vertical boundary indicator (260) and a periphery region (262) of the first display region corresponding to the cursor location within the first display region. The boundary indicators (258, 260) may be disposed only in the region defined by the periphery region (262), or they may stretch across all or a portion of the first display region. The boundary indicators (258, 260) and the periphery may each have a particular color, cross-hatch pattern, or combination of color and cross-hatch patterns. For example, the boundary indicators (258, 260) and periphery region (262) may each comprise a solid color with a blended or combined color at the regions of intersection (264, 266, 268) to assist in locating the cursor 156. The colors may be selected from a palette of choices depending on a user's preferences, or else based on a user's ability to distinguish various colors. For example, a particular user may be color insensitive (e.g. "color blind") and have a difficult time distinguishing red from green, blue from yellow, various blended or combined colors, or may only distinguish various shades of gray. Hence, more perceptible colors may be chosen or set by default.

A cursor enhancement effect may perform multiple effects shown in FIGS. 2A-2L in order to assist the user in locating the cursor, and in some cases to isolate the cursor to a particular region or field on a single screen. For example, the cursor enhancement effect may cause a computing device to perform actions including generating a sound, generating tactile feedback, changing a color or intensity of the cursor in the rendered display, changing an area around the cursor in the rendered display, increasing a size of the cursor in the rendered display, rotating the cursor in the rendered display, changing a color or intensity of a region rendered display that does not include the cursor, changing properties of a region along the cursor's path, changing a shape of the cursor, generating a sound based on the cursor's location, or any combination thereof. When used in conjunction with one or more three-dimensional (3-D) displays and/or headsets, the cursor effect may include a depth attribute so the enhanced cursor may have an appearance of either coming towards or going away from a user disposed adjacent to the 3-D displays.

Figure 3A:
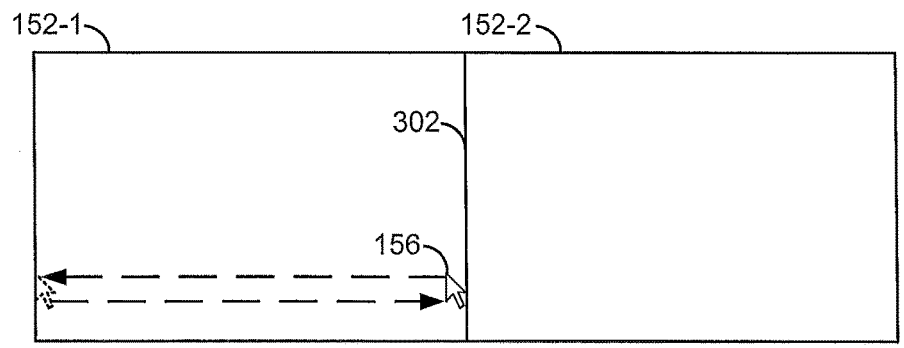
FIGS. 3A and 3B illustrate various exemplary embodiments of activating one or more cursor enhancement effects on two or more display screens, in response to detecting the sustained repetitive actuation of an input device.

Referring to FIG. 3A, an embodiment of activating one or more cursor enhancement effects on two or more display screens in response to detection of a sustained repetitive actuation is shown. In FIG. 3A, a rendered display on a first screen 152-1 and a second screen 152-2 are shown. Between the first screen 152-1 and second screen 152-2 is a screen division 302. According to an embodiment, after detection of a sustained repetitive actuation, the cursor enhancement effect may prevent a cursor 156 from crossing the screen division 302 in order to keep the cursor 156 in a single screen, such as the first screen 152-1, while the repetitive actuation is sustained. If the rendered display includes more than two screens, the cursor 156 may be prevented from moving across multiple screen divisions in order to keep the cursor 156 on a single screen. Four or more screens may be used and arranged in a checker-board pattern of top-left, top-right, bottom-left, and bottom-right. In this example, screen divisions similar to 302 would be found between each of the adjacent screens. Alternatively, three or more display screens (152-1, 152-2, 152-3, not shown) may be arranged linearly from left to right, or top to bottom with corresponding screen divisions 302 between adjacent screens. Finally, any number of screens may be used in a display pattern such as in an L-shape, a T-shape, a ring, or other display topology, based on user needs. Once the cursor enhancement effect is activated after detecting sustained repetitive actuation of the pointing device, the cursor would be locked to only one screen, or one region of a particular screen having multiple pre-defined fields, so that a user may quickly identify which display screen contains the cursor among a plurality of display screens.

Figure 3B:
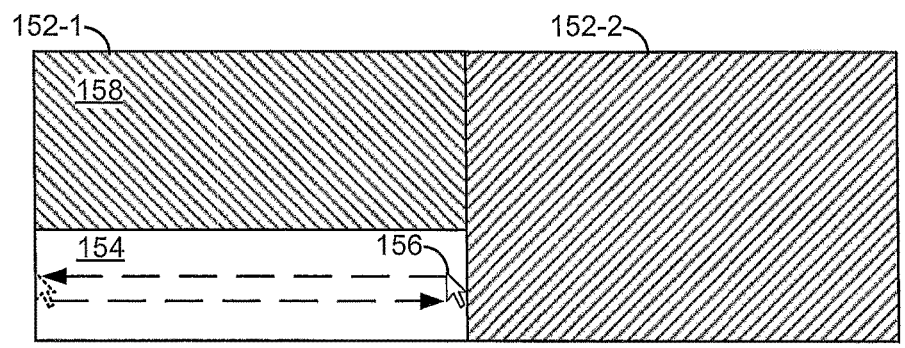

Referring to FIG. 3B, another embodiment of a cursor enhancement effect is shown. In FIG. 3B, a cursor enhancement effect may maintain the properties of a first portion 154 of the display screen 152-1 where the cursor 156 is located and change properties of a second portion 158 of the display screen 152-1 on which the cursor 156 is not located in order to increase visibility to the user of the first portion 154 of the display screen 152-1 on which the cursor 156 is located. For example, the cursor enhancement effect may reduce the intensity of color in a second region 158 in which the cursor 156 is not located along with reducing the intensity of color in an adjacent display screen 152-2. The cursor enhancement effect in the first region 154 may otherwise behave similarly to the cursor enhancement effects of FIG. 2F and may be combined with other cursor enhancement effects, as described. The intensity of the color of the first region 154 and the second region 158 may be reduced at the same rate or at different rates. In another example, the first region 154, the second region 158 or both, may change colors instead of or in addition to changing intensity. The rate at which the intensities change, the color the regions change to, a minimum or maximum intensity, or a combination thereof, may be based on a speed of the repetitive actuation, a magnitude of the repetitive actuation, a frequency of the repetitive actuation, length of time that the repetitive actuation has been sustained, another attribute of the repetitive actuation, or a combination thereof. The first region 154 and the second region 158 may change to the same color and same intensity levels or to different colors or to different intensity levels, or some combination thereof.

A cursor enhancement effect may perform multiple effects shown in FIGS. 3A and 3B in order to increase visibility of the cursor to the user. In addition, the cursor enhancement effect may perform any of the effects from FIGS. 2A-2L, when not contradictory, in addition to the effects shown in FIGS. 3A and 3B in order to increase the ability of a user to locate a cursor by providing supplemental visual, tactile, and/or auditory location information to the user. For example, the cursor enhancement effect may cause a computing device to perform actions including preventing a cursor from changing screens in a rendered display, changing a color or intensity of a screen without the cursor, generating a sound in response to a position of the cursor, generating tactile feedback based on the position of the cursor, changing a color or intensity of the cursor in the rendered display, changing an area around the cursor in the rendered display, increasing a size of the cursor in the rendered display, rotating the cursor in the rendered display, changing a color or intensity of a region of the rendered display that does not include the cursor, changing properties of a region along the cursor's path, changing a shape of the cursor, or a combination thereof.

Figure 4:
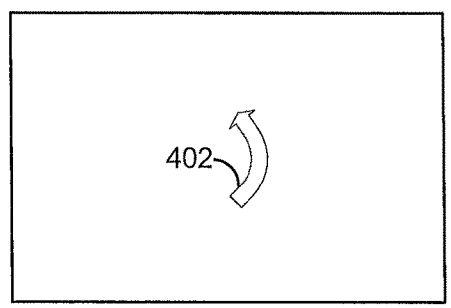
FIG. 4 illustrates an exemplary embodiment of activating one or more cursor enhancement effects, in response to detecting a cessation of the sustained repetitive actuation.

Referring to FIG. 4, an exemplary embodiment of activating one or more cursor enhancement effects in response to detecting the sustained repetitive actuation has ceased is shown. Once it is detected that the sustained repetitive actuation has ceased, the enhanced cursor effect may pause since it is not certain yet that the repetitive actuation has actually stopped completely, or whether the repetitive actuation is paused and may either stop completely or else the repetitive actuation may resume. When the sustained repetitive actuation has paused, the visual cursor enhancement effect may activate a subsequent visual cursor enhancement effect that causes the cursor (e.g., cursor 156) to temporarily change shape from the current shape or activity from the initial visual cursor enhancement effect to a different shape 402 or activity caused by the subsequent visual cursor enhancement effect. The different shape 402 may be based on a resting position of the pointing device 132 relative to a rough center of the repetitive actuation movements that initiated the cursor enhancement effect. For example, if after detecting the sustained repetitive actuation of the pointing device along a diagonal has ceased, and the pointing device is resting to the right of the rough center, the different shape 402 may reflect a bending or deforming of the cursor icon 156 to the right, as shown in FIG. 4, to indicate the resting location of the pointing device. Similarly, if after detecting the sustained repetitive actuation of the pointing device has ceased, the pointing device is resting to the left of the rough center, the different shape 402 may reflect a bending of the cursor icon to the left. Other implementations may include rendering an arrow as shape 402, where the arrow is pointing towards the resting location of the pointing device relative to the rough center. Other shape types and shape dimensions may be used. The shape 402 may last for a defined period of time before reverting the cursor to an original shape. The cursor enhancement effect shown in FIG. 4 may be activated following any of the cursor enhancement effects shown in FIGS. 2A-2L, 3A, and 3B or a combination of effects. The cursor enhancement effect(s) may be activated in response to a repetitive actuation stopping after being sustained for a first threshold period of time, and a second cursor enhancement effect may be activated during the repetitive actuation in response to the repetitive actuation being sustained for a second threshold period of time, as will be described below. The first threshold may be equal to, larger than, or smaller than the second threshold. The defined period of time, the first threshold, and the second threshold parameters may be selected by a user, or pre-selected by a designer of the software instructions. Other parameters may similarly be selected based on user needs.

Figure 5:
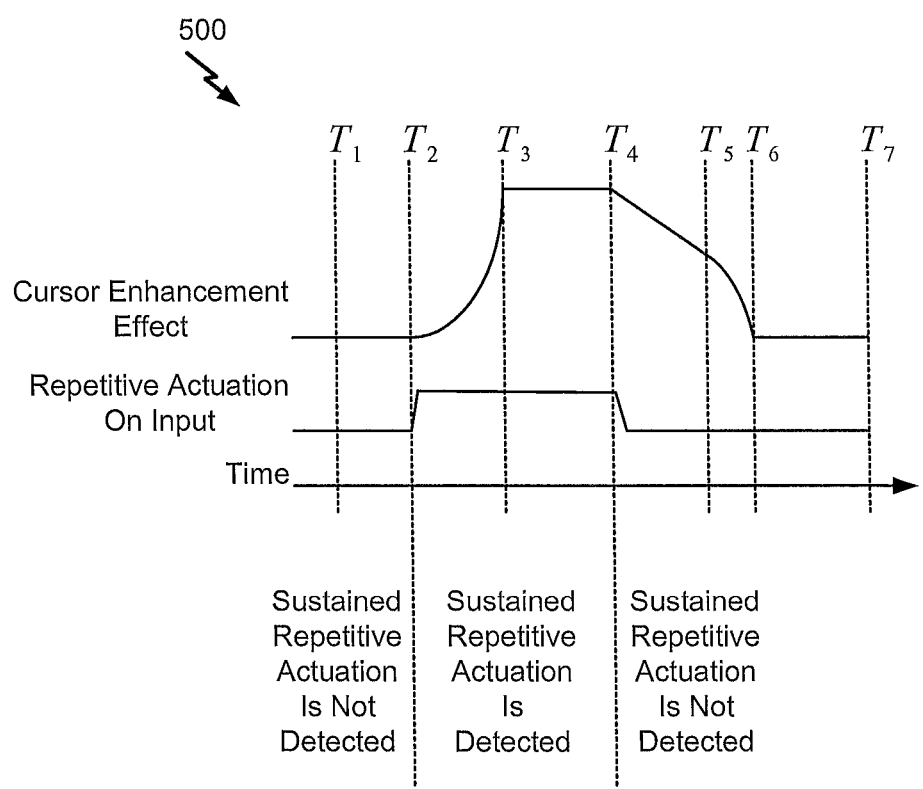
FIG. 5 illustrates a timing diagram for an exemplary embodiment associated with activating and deactivating one or more cursor enhancement effects.

FIG. 5 illustrates a timing diagram 500 for an exemplary embodiment associated with activating and deactivating one or more cursor enhancement effects. The one or more cursor enhancement effects may activate or deactivate at the same or different individual and relative rates than those shown by the timing diagram 500. FIG. 5 is not necessarily drawn to scale.

At time $T_1$ of the timing diagram 500, the input device 130, such as a pointing device or mouse 132, is not actuated or at least is not actuated in a sustained, repetitive manner. This may be considered ordinary usage of the input device 130, such as when the pointing device or mouse 132 is not moving or else is not moving in a sustained, repetitive manner. Accordingly the cursor on the corresponding display screen 152 does not move or else the cursor moves in a non-repetitive manner so that a sustained repetitive actuation of the input device 130 is not detected, and none of the cursor enhancement effects are active. Visually, the cursor 156 on the display screen 152 appears normal and the corresponding output devices, such as display screen(s) 152, sound emitter(s) 160, 174, and haptic emitter(s) 138, 172, are in a first condition.

At time $T_2$ of the timing diagram 500, a sustained repetitive actuation of the input device 130 is detected. The sustained repetitive actuation is above a first threshold period of time and magnitude, sustained repetitive actuation is detected, and the cursor enhancement effect is activated. The first threshold period of time may be determined according to the type of environment where the user input is received, or may be determined according to the needs of a user. For example, in an office environment where extraneous movement of the pointing device or mouse 132 is less common, a higher sensitivity to detecting repetitive actuation may be needed. In this case, the higher sensitivity may include either a shorter first threshold period of time, or a smaller threshold magnitude of actuation. Conversely, in an environment such onboard a moving aircraft at an operator console where extraneous movement due to the moving platform is common, a lower sensitivity to detecting repetitive actuation may be needed. In this case, the lower sensitivity may include either a longer first threshold period of time, or a larger threshold magnitude of actuation. Once the sustained repetitive motion of the input device 130 is determined to exceed either or both the first threshold period of time and the first threshold magnitude, sustained repetitive actuation of the input device 130 is detected, and one or more cursor enhancement effects are activated. Activation of one or more cursor enhancement effects may include changing a visual property of a display screen on a display device, activating a sound emitter, or activating a haptic emitter. As described, the sustained repetitive actuation of the input device 130 can include a "back and forth" repeating movement, or movement of a pointing device or mouse 132 in a substantially circular or oval repeating pattern, in a relatively short period of time. Alternatively, repetitive actuation may include pressing one or more keys on a keyboard 134 or gesturing before a gesture detection device 136. For example, pressing one or more keys on the keyboard includes pressing non-printing keys, the non-printing keys further including a Control key, an Alt key, and one or more arrow keys. Gesturing before a gesture detection device, such as a KINECT® sensor available from Microsoft Corporation of Redmond, Wash., and may include back and forth movements (e.g. waving, sweeping, zooming, etc.) by a human within a field of view of a suitable gesture detection system. In one example, when the cursor enhancement effect changes the size of the displayed cursor 156 may increase in size exponentially (or linearly) up to a saturation limit. In this way, the change in size is fluid rather than one or more jumps to a larger size. This continuity in a changing size may enhance the ability of a user to visually detect both the location of and relative size changes of an icon, for example. When the cursor enhancement effect changes the size of the displayed cursor 156, one can consider that the sustained repetitive actuation of the input 130 "pumps up" the cursor to a maximum size defined by the saturation size limit. It is not necessary for the cursor to increase in size all the way to a saturation limit. Instead, the cursor may increase in size during the period of the sustained repetitive actuation up to a size that is less than the saturation limit. The cursor enhancement effect may be any one or more of the cursor enhancement effects described in reference to any of FIG. 2A-2L, 3A-3B, or 4. When multiple cursor enhancement effects are used, the multiple cursor enhancement effects may be applied at the same rate or at different rates. For example, a first cursor enhancement effect may be activated on a first region 154 of FIG. 3B at a faster rate than a second cursor enhancement effect is activated on the second region 158 of FIG. 3B. Thus, in this example, the second region 158 corresponding to the screen that does not include the cursor may be dimmed or darkened faster than the first region 154 corresponding to a portion of the screen that does include the cursor. When the cursor enhancement effect includes a sound emission, the sound may change in frequency or intensity in either an exponential or linear manner. Similarly, when the cursor enhancement effect includes a haptic emission, an impulse, a vibration, or a contact surface shock may vary in either an exponential or linear manner.

At time $T_3$ of the timing diagram 500, sustained repetitive actuation continues to be detected, and the cursor enhancement effect may reach a saturation limit. The saturation limit may depend on the activated cursor enhancement effect. For example, when the cursor enhancement effect changes the size of the cursor 156, the saturation limit may correspond to a maximum cursor size. The maximum cursor size may correspond to a fraction of the display screen 152 size, corresponding to a size between about one-thirty-second to about one-fourth of the display screen size, a font point size corresponding to between about 18-points to about 288-points, or a linear size corresponding to between about 0.5 inches (about 1.27 cm) to about 4.0 inches (about 10.16 cm). In other examples, the saturation limit may correspond to a maximum or minimum intensity (e.g., brightness), a particular color or hue, a maximum or minimum rate of rotation or animated movement, a maximum or minimum sound volume, a maximum or minimum tactile feedback intensity or rate, etc. The cursor enhancement effect may remain applied at its saturation limit while the repetitive actuation is sustained (e.g., until time $T_4$).

At time $T_4$ of the timing diagram 500, a cessation of the sustained repetitive actuation of the input device 130 is detected. In this manner, sustained repetitive actuation is no longer detected. The repetitive actuation is below a second threshold period of time and magnitude. The second threshold period of time may be the same as the first threshold period of time, may be determined according to the type of environment where the user input is received, or may be determined according to the needs of a user. When the sustained repetitive actuation ceases at time $T_4$, the one or more activated cursor enhancement effects may be deactivated at a linear rate for a particular period of time (e.g., from time $T_4$ to time $T_5$). For example, when a cursor enhancement effect has exponentially increased the size of the cursor icon 156 between time $T_2$ and $T_3$, after time $T_4$ the cursor icon may gradually and linearly reduce in size. After the particular period of time has elapsed at time $T_5$, the cursor enhancement effect may be deactivated at a non-linear rate (e.g., exponential rate) until the cursor enhancement effect is completely deactivated at time $T_6$. In another embodiment, the cursor enhancement effect may remain activated for a threshold period of time before the cursor enhancement effect begins to deactivate. If multiple cursor enhancement effects are activated, they may deactivate at the same rate or at different rates. For example, the cursor may return to a default size more quickly than it returns to a default color. In this manner, deactivating the activated one or more cursor enhancement effects includes restoring the one or more of the output devices to the first condition before activation of the one or more cursor enhancement effects. This may include restoring a first display characteristic of the cursor 156 at a linear rate for a third predetermined period of time; and restoring the first display characteristic of the cursor at a non-linear rate for a fourth predetermined period of time. After time $T_6$ and before time $T_7$, the cursor returns to normal operation, as during the period between $T_1$ and $T_2$. At time $T_7$, another cursor enhancement effect may begin. The time between $T_6$ and $T_7$ may be long or short. The specific rates of change and relative durations illustrated in FIG. 5 are illustrative. In other embodiments, the cursor enhancement effect may be associated with a different rate or different durations. Since the pointing device may be displaced from the starting point when the sustained repetitive actuation began, the cursor may snap back to the starting location upon detection of the sustained repetitive actuation at $T_2$ or at the end of the cursor effect at $T_6$.

In another embodiment, a cursor enhancement effect may be persistently activated by a sustained repetitive actuation of the pointing device as described above to activate a toggle on-off mode where a cursor enhancement effect is persistently on until toggled off by a subsequent, sustained repetitive actuation of the same or a different input device from among a plurality of input devices 130. This may be especially helpful for a visually impaired user to detect movement of the cursor over one of many non-overlapping regions (246-252) as described in reference to FIG. 2K where haptic feedback such as vibration may be provided to the user when the cursor traverses one of the several intermediate boundaries 254 between the non-overlapping regions, or extreme boundaries 256 on the outside of the non-overlapping regions on a display device 152, or merely to identify when the cursor is within a particular non-overlapping region (246-252). Once the user has located the desired region, or is finished with the persistent cursor enhancement effect, the user could again impart a sustained repetitive actuation to the pointing device to deactivate the toggle on-off mode. In reference to FIG. 5, the toggle mode could be activated and deactivated in this manner by repeating the sustained repetitive actuation described between $T_2$ and $T_6$.

Figure 6:
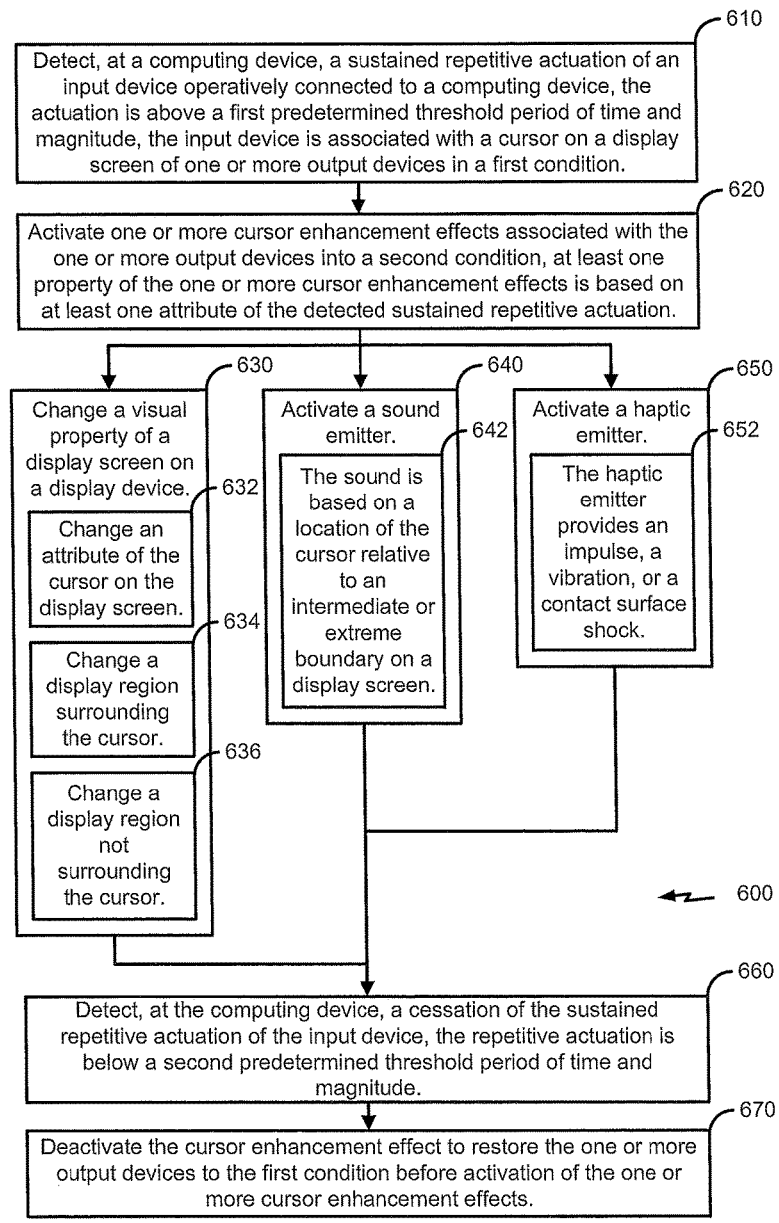
FIG. 6 is a flow chart illustration of an exemplary embodiment of a method for activating and then deactivating one or more cursor enhancement effects, in response to sustained repetitive actuation of an input.

FIG. 6 is a flow chart illustration of an exemplary embodiment of a method 600 for activating then deactivating one or more cursor enhancement effects, in response to sustained repetitive actuation of an input. The method 600 may be performed by computing device 110 of FIG. 1.

In reference to FIGS. 1 and 6, the method 600 may include detecting 610, at a computing device 110, a sustained repetitive actuation of an input device 130 operatively connected to the computing device, the sustained repetitive actuation being above a first predetermined threshold period of time and magnitude, the input device being associated with a cursor 156 on a display screen 152 of one or more output devices 150 in a first condition and operatively connected to the computing device. Method 600 may continue with activating 620 one or more cursor enhancement effects 122 associated with the one or more output devices into a second condition, wherein at least one property of the one or more cursor enhancement effects is based on at least one attribute of the detected sustained repetitive actuation. As described, repetitive actuation of an input device may include at least one of moving a pointing device 132 in one of a back and forth and a substantially circular manner; pressing one or more keys on a keyboard 134, wherein pressing one or more keys on the keyboard includes pressing non-printing keys, the non-printing keys further including a Control key, an Alt key, and one or more arrow keys, and gesturing before a gesture detection device 136. Activating the one or more cursor enhancement effects may include at least one of changing 630 a visual property of at least one display screen 152 associated with the one or more output devices 150, activating 640 a sound emitter (160, 174), and activating 650 a haptic emitter (138, 172). For example, the cursor enhancement effect may correspond to any one or more of the cursor enhancement effects of FIG. 2A-2L, 3A-3B, or 4.

According to method 600, changing a visual property of the display screen may include at least one of changing 632 at least one attribute of a cursor 156 rendered on the at least one display screen based on the cursor enhancement effect, wherein changing the at least one attribute of the cursor occurs at a rate that is one of exponential or linear, changing 634 a first display region 154 surrounding the cursor, and changing 636 a second display region 158 not surrounding the cursor. Further, changing at least one attribute of a cursor includes at least one of changing a size of the cursor, wherein changing the size of the cursor causes the cursor to increase in size up to a predetermined maximum cursor size, changing a shape of the cursor, rotating the cursor, changing a color of the cursor, changing an intensity of a color of the cursor, and transforming the cursor into one of an animated image and a still image, or a combination thereof. The predetermined maximum cursor size may correspond to one of a fraction of a display screen size corresponding to a size between about one-thirty-second to about one-fourth of the display screen, a font point size corresponding to between about 18-points to about 288-points, and a linear size corresponding to between about 0.5 inches (about 1.27 cm) to about 4.0 inches (about 10.16 cm). These parameters may be chosen based on user preferences and actual display screen size, and are not considered limiting. Changing a first display region may include at least one of adding a ripple effect that is one of originating or terminating at a location of the cursor, increasing a first intensity of the display screen, adding a horizontal boundary indicator 258 and a vertical boundary indicator 260 and a periphery region 262 of the first display region corresponding to the cursor location within the first display region, the vertical boundary indicator, horizontal boundary indicator, and the periphery region each include a different color with a blending of the different colors being disposed at regions of intersection (264, 266, 268), and adding a second color that is different from a first color of a first display region background along a path 226 of the cursor during the detected repetitive actuation, or a combination thereof. Changing a second display region may include decreasing an intensity of the second display region. Further, the one or more output devices 150 may include two or more display screens 152, wherein the cursor 156 is restricted from moving between the two or more display screens while the cursor enhancement effect is activated.

According to method 600, activating a sound emitter may include emitting 642 the sound based on a location of the cursor 156 on the display screen, wherein the location of the cursor on the display screen is relative to one of approaching and traversing one of at least one boundary and at least one axis, the at least one boundary being at least one of an intermediate boundary 254, an extreme boundary 256, and a boundary surrounding a predetermined region (246, 248, 250, 252) of the display screen, and the at least one axis being one of a first axis and a second axis orthogonal to the first axis, wherein a first attribute of the sound from a first speaker is determined based on a position of the cursor relative to the first axis of the display screen 152, and wherein a second attribute of the sound from a second speaker is determined based on a position of the cursor relative to the second axis, the first and second attribute including a sound intensity and a sound frequency.

Further in reference to method 600, activating 652 the haptic emitter (138, 172) may may include providing a haptic effect that is at least one of an impulse, a vibration, and a contact surface shock to a user through the associated pointing device 132, the haptic effect having at least one of a plurality of haptic attributes, wherein activating the haptic emitter is based on a location of the cursor 156 on the display screen, wherein the location of the cursor on the display screen is relative to one of at least one boundary and at least one axis, the at least one boundary being at least one of an intermediate boundary 254, an extreme boundary 256, and a boundary surrounding a predetermined region (246, 248, 250, 252) of the display screen 152, wherein a haptic effect is generated in response to one of approaching and traversing the one of the region, the intermediate boundary and the extreme boundary, and the at least one axis being one of a first axis and a second axis orthogonal to the first axis, wherein a first attribute of the haptic response is determined based on a position of the cursor relative to the first axis of the display screen, and wherein a second attribute of the haptic effect is determined based on a position of the cursor relative to the second axis.

Method 600 may conclude with detecting 660, at the computing device 110, a cessation of the sustained repetitive actuation of the input device 130, the cessation of the sustained repetitive actuation being below a second predetermined threshold period of time and magnitude; and deactivating 670 the one or more cursor enhancement effects 122 to restore the one or more of the output devices to the first condition before activation of the one or more cursor enhancement effects. Deactivating the one or more cursor enhancement effects may include restoring a first display characteristic of the cursor at a linear rate for a third predetermined period of time, and restoring the first display characteristic of the cursor at a non-linear rate for a fourth predetermined period of time. Thus, FIG. 6 describes a method 600 for providing cursor enhancement effects to help a user locate a cursor in a rendered display.

Figure 7:
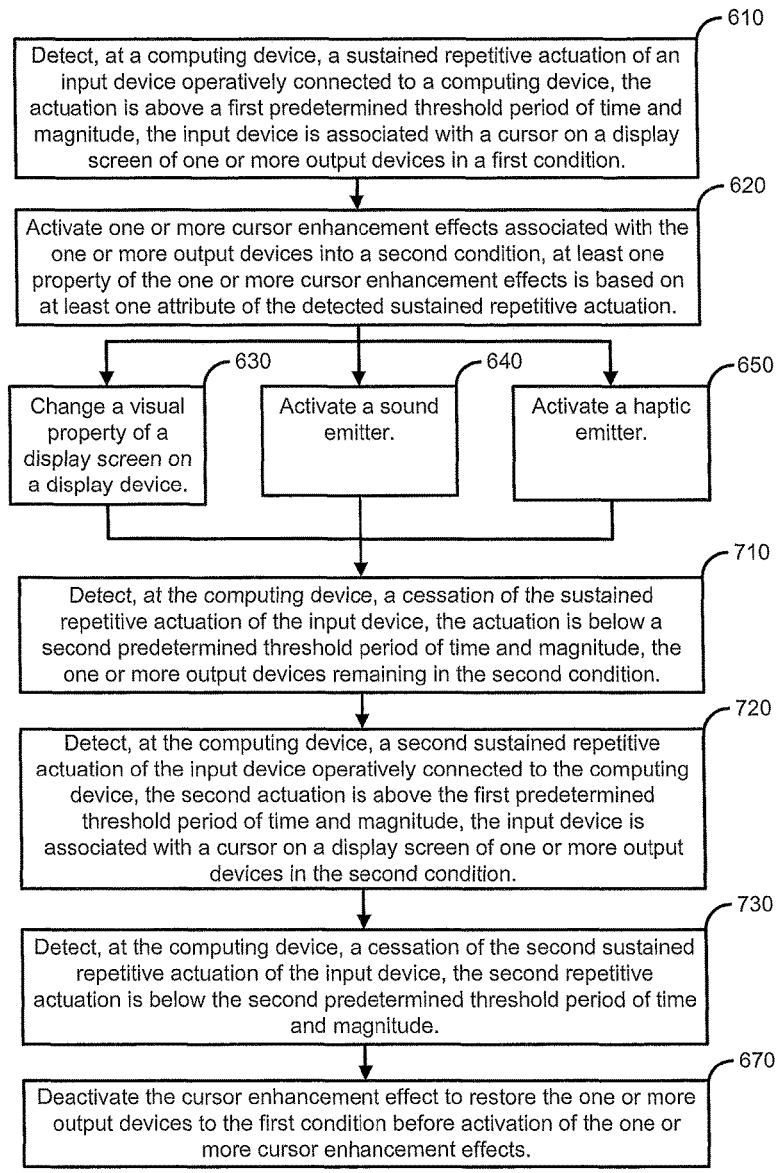
FIG. 7 is a flow chart illustration of an exemplary embodiment of a method for persistently activating one or more cursor enhancement effects, using the one or more cursor enhancement effects for an extended period, and then deactivating the activated one or more cursor enhancement effects, in response to a sequence of sustained repetitive actuations of an input.

FIG. 7 is a flow chart illustration of an exemplary embodiment of a method 700 for persistently activating one or more cursor enhancement effects, using the one or more cursor enhancement effects for an extended period, and then deactivating the activated cursor enhancement effects, in response to a sequence of sustained repetitive actuations of an input.

In reference to FIGS. 1, 6 and 7, the method 700 may include detecting 710, at the computing device 110, a cessation of the sustained repetitive actuation of the input device 130, the repetitive actuation being below a second predetermined threshold period of time and magnitude, the one or more output devices remaining in the second condition, and detecting 720, at the computing device 110, a second sustained repetitive actuation of an input device 130 operatively connected to the computing device, the second sustained repetitive actuation being above the first predetermined threshold period of time and magnitude, the input device being associated with a cursor 156 on the display screen 152 of one or more output devices 150 in the second condition and operatively connected to the computing device. Reference is made to FIG. 6 for method steps that are common between method 600 and method 700. Method 700 may conclude with detecting 730, at the computing device, a cessation of the second sustained repetitive actuation of the input device 130, the second sustained repetitive actuation being below the second predetermined threshold period of time and magnitude, and deactivating 670 the one or more cursor enhancement effects 122 to restore the one or more of the output devices to the first condition before activation of the one or more cursor enhancement effects.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may have been grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

I claim:

1. A method comprising:
    detecting, at a computing device, a sustained repetitive actuation of a pointing device operatively connected to the computing device, the sustained repetitive actuation being above a first predetermined threshold period of time and being above a first predetermined threshold magnitude, the pointing device being associated with a cursor movable on first and second display screens of one or more output devices operatively connected to the computing device, the first predetermined threshold magnitude based on distances between extremes of travel of the sustained repetitive actuation;
    responsive to detecting the sustained repetitive actuation, activating one or more cursor enhancement effects associated with the one or more output devices, the activating the one or more cursor enhancement effects comprising changing at a first rate a first visual property of a first display region of the first display screen and changing at a second, different rate a second visual property of a second display region of the first display screen, wherein the cursor is included in the first display region or the second display region;

moving the cursor within the first display screen during the activation of the one or more cursor enhancement effects, wherein the movement of the cursor is restricted, by the computing device, to prevent movement of the cursor from the first display screen to the second display screen of the one or more output devices while the one or more cursor enhancement effects is activated; and responsive to detecting a cessation of the sustained repetitive actuation, deactivating the one or more cursor enhancement effects, wherein movement of the cursor from the first display screen to the second display screen is unrestricted responsive to the one or more cursor enhancement effects being deactivated.

2. The method of claim 1, wherein the sustained repetitive actuation of the pointing device includes at least one of:

moving the pointing device in a back and forth manner or in a substantially circular manner; or gesturing before a gesture detection device.

3. The method of claim 1, wherein activating the one or more cursor enhancement effects further includes at least one of:

activating a sound emitter; or activating a haptic emitter.

4. The method of claim 3, where activating the sound emitter further comprises changing a pitch, a frequency, or an intensity of a sound, and wherein activating the haptic emitter further comprises changing a magnitude, frequency, or pattern of a haptic effect provided to a user, and wherein the haptic effect includes an impulse, a vibration, or a contact surface shock.

5. The method of claim 1, wherein the first visual property includes a color of a background layer of the first display region.

6. The method of claim 5, wherein the first visual property includes an intensity of the color.

7. The method of claim 1, wherein activating the one or more cursor enhancement effects further includes at least one of:

changing a shape of the cursor, rotating the cursor, changing a color of the cursor, changing an intensity of a color of the cursor, transforming the cursor into one of an animated image and a still image, or a combination thereof.

8. The method of claim 7, wherein changing the shape of the cursor further comprises changing the shape of the cursor to a first shape when the cursor is moved in a first direction during the sustained repetitive actuation and changing the shape of the cursor to a second shape when the cursor in moved in a second direction during the sustained repetitive actuation, wherein rotating the cursor further comprises changing a speed of the rotation of the cursor based on at least one attribute of the sustained repetitive actuation, and wherein changing the color of the cursor further comprises continuously changing the color of the cursor based on the sustained repetitive actuation.

9. The method of claim 1, further comprising:

determining a display size of the first display screen; and determining a maximum cursor size as a fraction of the display size, wherein activating the one or more cursor enhancement effects includes changing a size of the cursor, wherein changing the size of the cursor includes increasing a size of the cursor up to the maximum cursor size.

10. The method of claim 1, wherein activating the one or more cursor enhancement effects further includes adding a ripple effect that originates or teiuiinates at a location of the cursor.

11. The method of claim 1, wherein changing the second visual property of the second display region comprises decreasing an intensity of the second display region.

12. The method of claim 1, wherein activating the one or more cursor enhancement effects includes activating a haptic emitter to provide a haptic effect to a user wherein a first attribute of the haptic effect is determined based on a position of the cursor relative to a first axis of the first display screen, and wherein a second attribute of the haptic effect is determined based on a position of the cursor relative to a second axis of the first display screen.

13. The method of claim 1, wherein activating the one or more cursor enhancement effects includes activating a sound emitter, and wherein activating the sound emitter includes emitting sound based on a location of the cursor on the first display screen, wherein a first attribute of the sound from a first speaker is determined based on a position of the cursor relative to a first axis of the first display screen, and wherein a second attribute of the sound from a second speaker is determined based on a position of the cursor relative to a second axis of the first display screen, the first and second attribute including a sound intensity and a sound frequency.

14. The method of claim 1, wherein activating the one or more cursor enhancement effects includes changing a size of the cursor at a third rate that is based on a movement rate of the pointing device, wherein deactivating the one or more cursor enhancement effects includes restoring the size of the cursor at a fourth rate different from the third rate, wherein the fourth rate is a linear rate for a first period of time.

15. The method of claim 14, wherein deactivating the one or more cursor enhancement effects comprises restoring the size of the cursor at a non-linear rate for a second period of time, the second period of time occurring subsequent to the first period of time.

16. The method of claim 14, further comprising dynamically adjusting the third rate in response to a change in at least one attribute of the sustained repetitive actuation.

17. The method of claim 1, further comprising:

displaying a horizontal boundary indicator indicating a horizontal boundary of a region containing the cursor, the horizontal boundary indicator having a first color; and displaying a vertical boundary indicator indicating a vertical boundary of the region containing the cursor, the vertical boundary indicator having a second color different from the first color, wherein the first color and the second color are blended at regions of intersection of the horizontal boundary and the vertical boundary.

18. The method of claim 1, wherein detecting the sustained repetitive actuation of the pointing device further comprising determining at least one attribute of the sustained repetitive actuation, wherein the at least one attribute of the sustained repetitive actuation includes speed, intensity, or rate of repetitive actuation of the pointing device.

19. The method of claim 1, wherein the movement of the cursor travels along a path on the first display screen, wherein the path includes the first display region and the second display region.

20. The method of claim 1, wherein the first visual property of the first display region comprises a color, a brightness level, or an intensity level, and wherein the second visual property of the second display region comprises a color, a brightness level, or an intensity level.

21. The method of claim 1, further comprising activating a brake coupled to the pointing device, the brake for providing resistance to movement of the pointing device in response to the cursor being at or traversing a boundary.

22. The method of claim 21, wherein the boundary is one of an intermediate boundary or an extreme boundary.

23. The method of claim 1, wherein detecting the sustained repetitive actuation of the pointing device comprises detecting repetitive movement of the cursor between a third region and a fourth region of the first display screen, the second display screen, or a combination thereof.

24. A system, comprising:
a processor; and
a memory accessible to the processor, the memory storing instructions that are executable by the processor to perform operations comprising:
  detecting, at a computing device, a sustained repetitive actuation of a pointing device operatively connected to the computing device, the sustained repetitive actuation being above a threshold magnitude for longer than a threshold period of time, the pointing device being associated with a cursor movable on first and second display screens of one or more output devices operatively connected to the computing device, the threshold magnitude based on distances between extremes of travel of the sustained repetitive actuation;
  responsive to detecting the sustained repetitive actuation, activating one or more cursor enhancement effects associated with the one or more output devices, the activating the one or more cursor enhancement effects comprising changing at a first rate of a visual property of a first display region of the first display screen and changing at a second, different rate of a visual property of a second display region of the first display screen, wherein the cursor is included in the first display region or the second display region;
  moving the cursor within the first display screen after activating the one or more cursor enhancement effects, wherein the movement of the cursor is restricted to prevent movement of the cursor from the first display screen to the second display screen of the one or more output devices while the one or more cursor enhancement effects is activated; and
  deactivating the one or more cursor enhancement effects, wherein movement of the cursor from the first display screen to the second display screen is unrestricted responsive to the one or more cursor enhancement effects being deactivated.

25. The system of claim 24, wherein the operations further comprise:
  detecting, at the computing device, a subsequent sustained repetitive actuation of the pointing device, wherein the one or more cursor enhancement effects are deactivated responsive to detecting the subsequent sustained repetitive actuation of the pointing device.

26. A computer-readable storage device storing instructions that are executable by a processor to cause the processor to perform operations comprising:
  detecting, at a computing device, a sustained repetitive actuation of a pointing device operatively connected to the computing device, the sustained repetitive actuation being above a threshold magnitude for longer than a threshold period of time, the pointing device being associated with a cursor movable on first and second display screens of one or more output devices operatively connected to the computing device, the threshold magnitude based on distances between extremes of travel of the sustained repetitive actuation;
  responsive to detecting the sustained repetitive actuation, activating one or more cursor enhancement effects associated with the one or more output devices, the activating the one or more cursor enhancement effects comprising changing at a first rate a visual property of a first display region of the first display screen and changing at a second, different rate a visual property of a second display region of the first display screen, wherein the cursor is included in the first display region or the second display region;
  after activating the one or more cursor enhancement effects, moving the cursor within the first display screen, wherein the movement of the cursor is restricted, by the computing device, to prevent movement of the cursor from the first display screen to the second display screen of the one or more output devices while the one or more cursor enhancement effects is activated; and
  responsive to detecting cessation of the sustained repetitive actuation, deactivating the one or more cursor enhancement effects, wherein movement of the cursor from the first display screen to the second display screen is unrestricted responsive to the one or more cursor enhancement effects being deactivated.

27. The computer-readable storage device of claim 26, wherein activating the one or more cursor enhancement effects further comprises changing a display characteristic of the cursor at a first third rate, and wherein deactivating the one or more cursor enhancement effects further comprises restoring the display characteristic of the cursor at a fourth rate.

* * * * *